July 16, 1957 R. A. DAVIS 2,799,170
UNIVERSAL AUTO RADIO CONTROL OR THE LIKE
Filed May 2, 1955
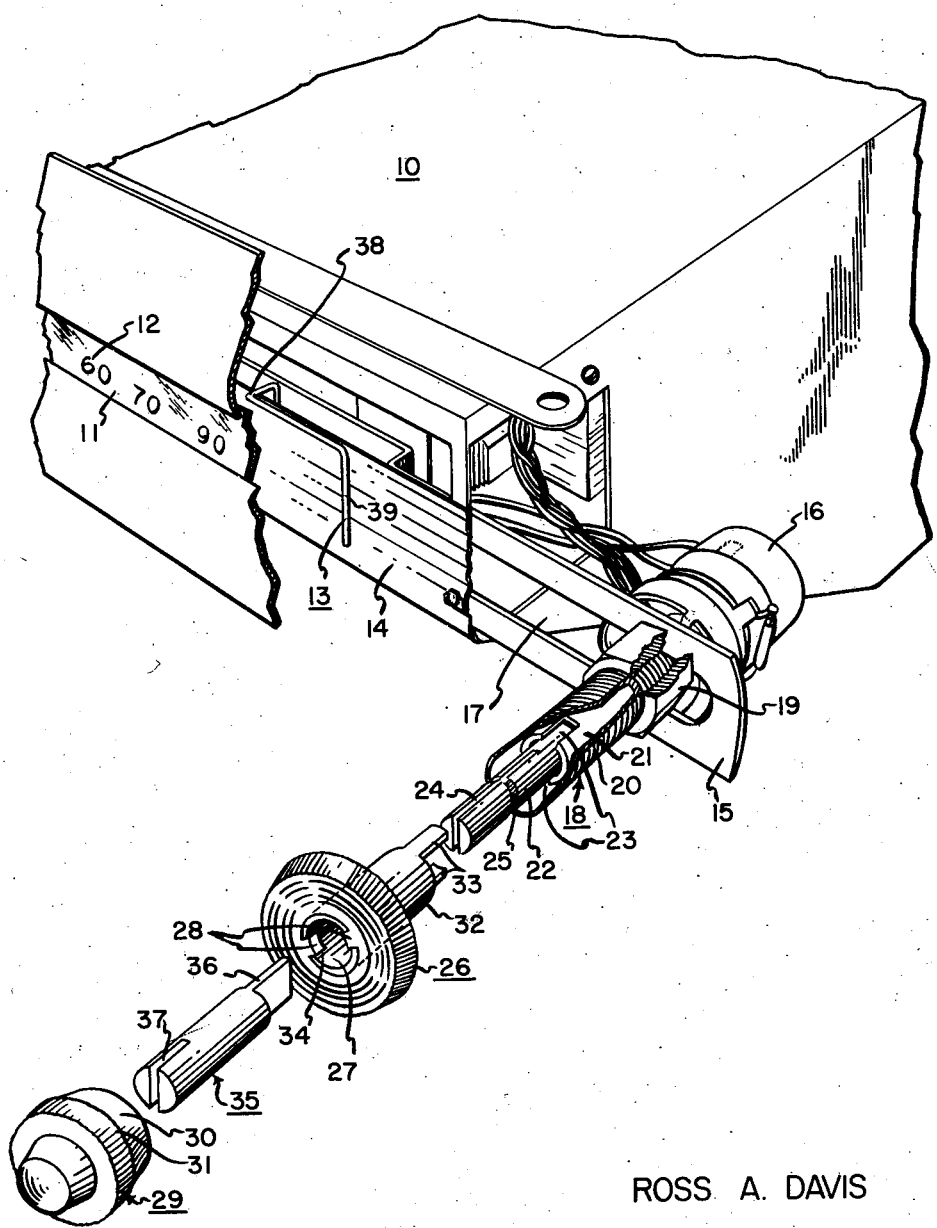
ROSS A. DAVIS
*INVENTOR.*
BY [signature]
HIS ATTORNEY United States Patent Office 2,799,170
Patented July 16, 1957

2,799,170
UNIVERSAL AUTO RADIO CONTROL OR THE LIKE

Ross A. Davis, Los Angeles, Calif.

Application May 2, 1955, Serial No. 505,178

4 Claims. (Cl. 74—10.45)

This invention relates to improvements in control apparatus for radio equipment and, more particularly, to a control assembly which is versatile enough to permit the application of an auto radio receiver embodying this assembly to any automobile installation.

In the past auto radios have been designed for specific models of automobiles and, because of the substantial variation in the positioning of various elements, such as the controls, in the many installations in the different automobiles, a limited number of each model has been made. This has resulted in a failure to take advantage of the great cost savings which can be realized by standardizing the receiver construction while making it sufficiently flexible so as to meet the varying requirements of the automobile manufacturers.

Therefore, it is an object of this invention to provide an auto radio receiver which is universal in its adaptability to various automobile installations.

It is an additional object of this invention to provide a universal auto radio control assembly.

According to the present invention, the shaft of the ratio control whether it be a single shaft or a concentric multiple control shaft, is segmented with contiguous sections being keyed together so as to permit the application of rotary forces to the control and the control is adjustable in its horizontal positioning by reason of its being mounted in a slotted bracket extending from the body of the receiver. The shafts may also contain break-off grooves for minimizing their length in certain applications.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which:

The sole figure is a partially exploded view of a universal auto radio control according to this invention.

In the sole figure, receiver 10 includes dial scale 11 which may be translucent and bears opaque numerals 12 and behind which indicator 13 moves as the receiver is tuned. Corrugated strip 14 diffuses the light for proper illumination of dial scale 11. Bracket 15 is supported from and becomes an integral part of receiver 10 and extends from the opposite edges of receiver 10 towards the forward portion thereof. Control 16 is held at a predetermined point along slot 17 in bracket 15 by means of sleeve 18 which is threaded internally in the region of nut portion 19 and is threaded externally in the region of portion 20. Because control 16 is a dual control, it requires dual concentric shafts 21 and 22, the latter being nested within the former and being rotatably free thereof. Outer sleeve 21 contains a pair of diametrically opposed keyways 23. Inner shaft 22 contains keyways or slots 24, which are diametrically disposed, and break-off groove 25. First knob 26 has a concentric opening 27 therein which is circular and of the outer diameter of outer shaft 21 except for a pair of diametrically opposed keys 28. Second knob 29 has an opening 30 therein which is cylindrical and of the outer diameter of inner shaft 22, except that it is divided by diametrically disposed blade or key 31 adapted to engage slot 24 in inner shaft 22. Keys 28 in first knob 26 are dimensioned to slide reasonably freely into keyways 23 in outer shaft 21. Outer shaft extension 32 includes keys 33 and is also dimensioned to fit keyways 23 and at the opposite end includes keyways 34 corresponding in dimension to keyways 23. The diameter of extension 32 is, of course, substantially identical with the diameter of outer shaft 21, both internally and externally. Inner shaft extension 35, having the same outside diameter as inner shaft 22, includes key portion 36 of substantially the same dimensions as key 31 in knob 29. Further, extension 35 includes slot or keyway 37 having substantially the same dimensions as slot 24 in shaft 22. Shaft extension 35 is of greater length than shaft extension 32 to permit application of knob 29 when the assembly is completed.

This structure has the following characteristics. If radio 10 is positioned a substantial distance behind the dashboard of the automobile and, hence, a corresponding distance behind dial scale 11, a plurality of extensions of both the inner shaft 22 and the outer shaft 21 may be engaged to bring the shaft assembly beyond the dashboard of the automobile for application of knobs 26 and 29. While the sole figure has shown only one extension element for each of the shafts, it is apparent that a greater number of such extensions may be engaged if required. It may be necessary in such a case to use a longer sleeve member 18. As can be seen from referring to the sole figure, slot or keyway 24 in shaft 22 is of greater than conventional length. Additionally, a break-off groove 25 is provided. This combination permits shortening of shaft 22 with ease if the installation so requires while retaining the ability to engage key 31 in knob 29.

Hence, slot 17 permits lateral positioning of control 16, and extension elements of the type illustrated, that is elements 32 and 35, permit positioning of radio 10 at any required distance behind dial scale 11. Thus, such a control assembly permits a substantially universal application of receiver 10 to the space requirements and positioning requirements of the automobile manufacturer. It is to be understood that a corresponding lateral positioning and shortening or lengthening of any remaining control elements, such as the tuning element, may be accomplished by utilizing this same technique. There has been provided, therefore, a control assembly for radios, particularly automobile radios, which is substantially universal in its application. It is to be noted, that if pointer 13 is made of ductile material that pointer may be bent outwardly from fulcrum point 38 so as to place portion 39 immediately adjacent dial scale 11.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A control assembly for a radio receiver including a control having at least one control shaft, means associated with said radio receiver for supporting said shaft, said shaft having a keyway therein, a knob including a key dimensioned to cooperate with said keyway, and a shaft extension element including a key portion at one end of said element and a keyway portion at the other end of said element, said key portion of said extension element having substantially the same dimensions as said key of said knob and said keyway portion of said extension element having dimensions corresponding to the dimensions of said keyway in said control shaft, said shaft extension element being positioned with its key portion in press-fit engagement with said keyway in said control shaft and with its keyway portion in press-fit engagement with said key in said knob.

2. Apparatus according to claim 1 in which said means for supporting said shaft includes a bracket provided with a longitudinal slot, said bracket being secured to said radio receiver, said shaft being angularly disposed with respect to said bracket and adjustably secured within said slot for selective lateral positioning of said shaft with respect to said radio receiver.

3. A control assembly for a radio receiver including a dual control having first and second shafts, said second shaft being hollow and concentrically disposed about said first shaft, said first shaft having a first keyway therein, said second shaft having a second keyway therein, a first knob including a first key portion dimensioned to cooperate with said first keyway, a first shaft extension element having a key portion and a keyway portion corresponding in dimensions to said first key portion and said first keyway, respectively, a second knob having a concentric opening therethrough and including a key portion projected angularly into said opening and dimensioned to cooperate with said second keyway, a second shaft extension being hollow and including a key portion projected angularly within said second extension at one end thereof and a keyway portion at the other end of said second extension, said key portion of said second extension being dimensioned to cooperate with said second keyway of said second shaft, said keyway portion of said second extension being dimensioned to cooperate with said key portion in said second knob, said first shaft extension element being positioned with its key portion in press-fit engagement with said first keyway of said first shaft and its keyway portion in press-fit engagement with said first key portion of said first knob, said second shaft extension being positioned with its key portion engaging said second keyway portion in said second shaft and with its keyway portion engaging said key portion of said second knob, said first shaft extension element being positioned so as to extend through said second knob, said first knob being outwardly disposed relative to said second knob and in abutment thereagainst whereby said first knob is in inwardly retaining relationship with respect to said second knob, said first and second knobs being rotatable independently of each other.

4. Apparatus according to claim 3 in which said first shaft includes a peripheral break-off groove located for selective dimensional alteration of the overall effective length of said first shaft whereby said first and second knobs may be maintained in abutting relationship with respect to each other.

References Cited in the file of this patent

UNITED STATES PATENTS

| | | |
|---|---|---|
| 2,437,785 | Mucher | Mar. 16, 1948 |
| 2,628,799 | Aaby | Feb. 17, 1953 |
| 2,630,341 | Downey | Mar. 3, 1953 |
| 2,690,094 | Becker | Sept. 28, 1954 |
| 2,709,060 | Williams | May 24, 1955 |